(12) United States Patent
Niarfeix

(10) Patent No.: US 9,638,258 B2
(45) Date of Patent: May 2, 2017

(54) ROLLING-CONTACT BEARING WITH OUTER RING IN THE FORM OF A SECTION OF A SPHERE AND WITH A SENSOR MEMBER

(71) Applicant: Francois Niarfeix, Saint-Cyr (FR)

(72) Inventor: Francois Niarfeix, Saint-Cyr (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/924,777

(22) Filed: Oct. 28, 2015

(65) Prior Publication Data

US 2016/0123401 A1 May 5, 2016

(30) Foreign Application Priority Data

Oct. 30, 2014 (FR) ..................... 14 60458

(51) Int. Cl.
| | |
|---|---|
| *F16C 41/00* | (2006.01) |
| *F16C 19/06* | (2006.01) |
| *F16C 23/08* | (2006.01) |
| *G01P 3/44* | (2006.01) |

(52) U.S. Cl.
CPC ............ *F16C 41/007* (2013.01); *F16C 19/06* (2013.01); *F16C 23/084* (2013.01); *F16C 41/004* (2013.01); *F16C 41/008* (2013.01); *G01P 3/443* (2013.01)

(58) Field of Classification Search
CPC .... F16C 23/084; F16C 41/007; F16C 41/008; F16C 19/06
See application file for complete search history.

(56) References Cited

U.S. PATENT DOCUMENTS

| | | | | |
|---|---|---|---|---|
| 6,535,135 B1* | 3/2003 | French | ..................... | B61K 9/04 340/682 |
| 2003/0115977 A1* | 6/2003 | Holweg | .................. | F16C 19/52 73/865.9 |
| 2004/0105602 A1* | 6/2004 | Mizutani | ................. | F16C 33/78 384/448 |

(Continued)

FOREIGN PATENT DOCUMENTS

| | | |
|---|---|---|
| DE | 19710337 A1 | 9/1998 |
| DE | 102008007999 A1 | 8/2009 |

(Continued)

*Primary Examiner* — Phillip A Johnson
(74) *Attorney, Agent, or Firm* — Bryan Peckjian; SKF USA Inc. Patent Dept.

(57) ABSTRACT

A rolling-contact bearing comprising an inner ring, an outer ring with an outer surface in the form of a section of a sphere, rolling bodies between the inner ring and the outer ring, an encoder washer constrained to rotate with the inner ring, a sensor member being designed to detect a rotation of the encoder washer, and a support member having an inner surface in the form of a section of a sphere, the inner surface being designed to be in sliding contact with the outer surface of the outer ring. The support member is designed to hold the sensor member, in relation to the encoder washer, in a position in which the sensor member can detect a rotation of the encoder washer. The sensor member includes a transponder intended to communicate wirelessly with a detector.

4 Claims, 1 Drawing Sheet

(56) References Cited

U.S. PATENT DOCUMENTS

| | | | |
|---|---|---|---|
| 2006/0274983 A1* | 12/2006 | Takahashi | F16C 19/186 384/448 |
| 2007/0063870 A1 | 3/2007 | Sahashi et al. | |
| 2008/0317397 A1* | 12/2008 | Muranaka | B60B 27/00 384/448 |
| 2014/0140648 A1* | 5/2014 | Ito | G06K 19/0723 384/448 |

FOREIGN PATENT DOCUMENTS

| | | |
|---|---|---|
| DE | 102011003703 A1 | 8/2012 |
| EP | 0137270 A2 | 4/1985 |
| EP | 0908729 A1 | 4/1999 |
| EP | 1203960 A2 | 5/2002 |
| EP | 2644921 A1 | 10/2013 |
| WO | 2010064088 A1 | 6/2010 |

* cited by examiner

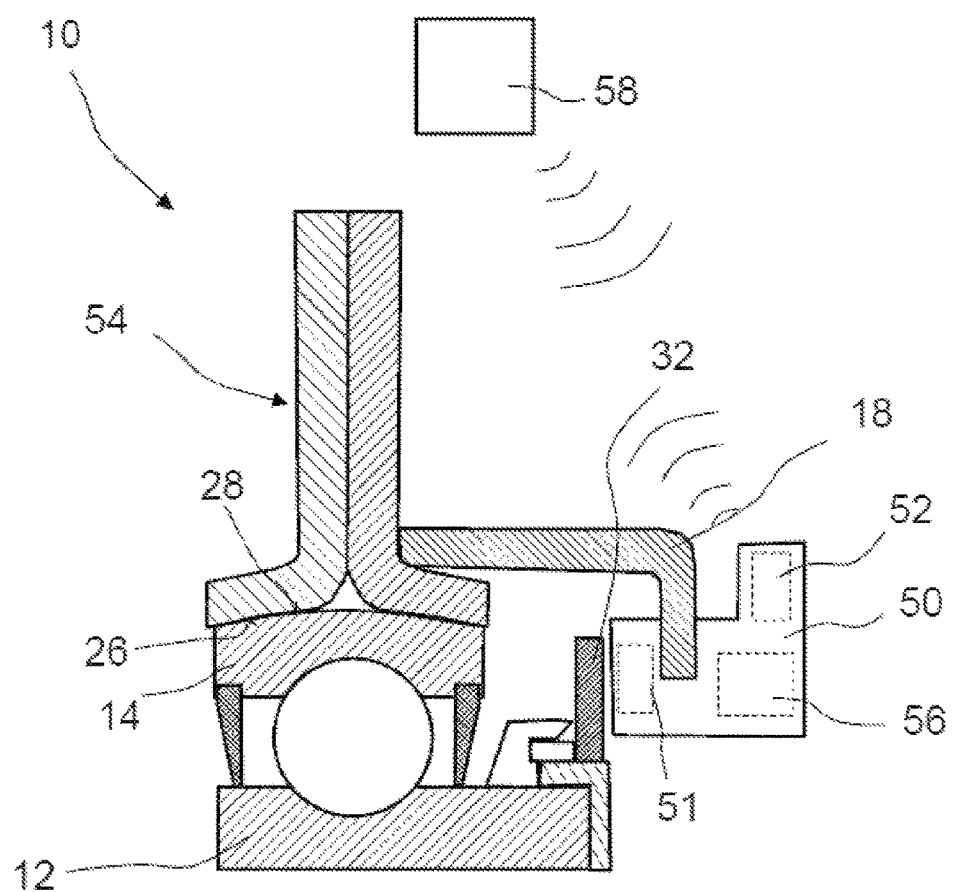

ROLLING-CONTACT BEARING WITH OUTER RING IN THE FORM OF A SECTION OF A SPHERE AND WITH A SENSOR MEMBER

CROSS REFERENCE TO RELATED APPLICATION

This is a Non-Provisional patent application, filed under the Paris Convention, claiming the benefit of France (FR) Patent Application Number 1460458, filed on 30 Oct. 2014 (30.10.2014), which is incorporated herein by reference in its entirety.

FIELD OF THE INVENTION

The invention relates to a rolling Y-bearing for a rolling-contact Y-bearing including a sensor and a machine fitted with such a bearing.

BACKGROUND OF THE INVENTION

Rolling Y-bearings, which usually refer to insert bearings, are based on sealed rigid ball bearings, but have a convex outer ring and, in most cases, an overhanging inner ring with a specific blocking device to enable quick and easy assembly on the shaft.

Rolling Y-bearings can be individual bearings or full bearings. Full Y-bearings comprise a bearing housing, a rolling bearing and a joint that are preassembled and greased in the factory. Such ready-to-assemble bearings may admit a moderate initial alignment fault, but do not permit axial movement of the shaft.

Full Y-bearings and rolling Y-bearings are a simple, efficient solution offering numerous advantages.

Rolling Y-bearings are often used in the domain of agricultural applications. Nowadays, farmers are facing increasing pressure to remain productive while containing costs and reducing environmental impact. Defective rolling bearings often prevent this objective from being achieved. Contamination by pollutants or lubricant leaks caused by defective joints often cause the premature failure of rolling bearings for shafts used in agricultural applications, causing machines to break down.

In particular in the domain of agricultural applications, it is important to guarantee the usability of machines at harvest time, even if the machine has not been used for a long time. It is therefore essential to avoid elements liable to become friable.

Document WO 2010/064088 describes a rolling-contact bearing comprising an inner ring, an outer ring with an outer surface in the form of a section of a sphere, rolling bodies between the inner ring and the outer ring, an encoder washer constrained to rotate with the inner ring, a sensor being designed to detect a rotation of the encoder washer, a support member having an inner surface in the form of a section of a sphere, the inner surface being designed to be in sliding contact with the outer surface of the outer ring, the support member being designed to hold the sensor, in relation to the encoder washer, in a position in which the sensor can detect a rotation of the encoder washer.

The sensor is powered and designed to communicate via a wire with an external control or monitoring unit mounted on the bearing or on a casing of the machine in which the bearing is fitted. Separating the sensor from the control unit makes it possible to adapt the sensor system to the dimensions of the rolling bearing very easily, and to assemble the control unit in a suitable position by simply adapting the support member and the length of the wire.

However, this solution is not entirely satisfactory since the wire is liable to get damaged unless costly means are used to protect same.

SUMMARY OF THE INVENTION

For this purpose, the invention relates to a rolling-contact bearing comprising an inner ring, an outer ring with an outer surface in the form of a section of a sphere, rolling bodies between the inner ring and the outer ring, an encoder washer constrained to rotate with the inner ring, a sensor being designed to detect a rotation of the encoder washer, and a support member having an inner surface in the form of a section of a sphere, the inner surface being designed to be in sliding contact with the outer surface of the outer ring, the support member being designed to hold the sensor, in relation to the encoder washer, in a position in which the sensor can detect a rotation of the encoder washer.

In a preferred embodiment, the sensor is a giant magnetoresistance (GMR) sensor.

According to one aspect of the invention, the sensor member includes a transponder intended to communicate wirelessly with a wireless detector.

With the invention, damage to a wire or a bundle of cables can be avoided. The reliability of the sensor system can therefore be enhanced.

According to an advantageous aspect of the invention, the detector is mounted on a bearing including the support member. The inventors have surprisingly found that reliability can be enhanced by replacing wired communication with wireless communication, even if the transponder and the detector are rigidly connected to the same bearing. The technical assumption that wireless communication only lends itself to applications in which the transponder and the detector are positioned away from one another is disproved.

In a preferred embodiment, the sensor member includes an independent energy-generation feature. Preferably, the energy-generation feature includes at least one coil interacting with an oscillating magnetic field created by the encoder washer. Preferably, this coil is mounted on the plate of the sensor. This guarantees independent operation while using the oscillating magnetic field created by the encoder washer to detect the rotation of the encoder washer and to generate enough energy to process the signal from the sensor and to send the results of this processing.

In a preferred embodiment, the sensor member includes a Radio Frequency Identification (RFID) label including the sensor, the signal processing component and the transponder, as well as a memory in a single unit. Preferably, the sensor member can work either using the energy generated by the energy-generation feature using a relative rotation of the encoder washer, or using the energy supplied from outside in a passive operating mode.

BRIEF DESCRIPTION OF THE FIGURES

Other objectives and advantages of the invention are set out in the description below, which is provided with reference to the attached drawings, in which:

FIG. 1 is a schematic representation of a rolling-contact bearing according to an embodiment of the invention.

DETAILED DESCRIPTION OF THE EMBODIMENTS

A rolling-contact bearing according to an embodiment of the invention is described with reference to FIG. 1. The rolling-contact bearing 10 includes an inner ring 12, an outer ring 14 with an outer surface 28 in the form of a section of a sphere, rolling bodies between the inner ring 12 and the outer ring 14, an encoder washer 32 constrained to rotate with the inner ring 12 and a sensor member 50 designed to detect a rotation of the encoder washer 32 and a support member 18. The sensor member 50 is constrained to rotate with the support member 18, in particular with a bearing 54. The sensor member 50 includes at least one detection element or sensor 51.

The support member 18 has an inner surface 26 in the form of a section of a sphere. This inner surface 26 is designed to be in sliding contact with the outer surface 28 of the outer ring 14. Simultaneously, the support member 18 is designed to keep the sensor member 50, in relation to the encoder washer 32, in a position in which the sensor member 50 is able to detect a rotation of the encoder washer 32, while enabling a degree of reciprocal sliding between the surfaces 26, 28 in the form of a section of a sphere.

The sensor 51 of the sensor member 50 is a giant magnetoresistance (GMR) sensor. In alternative embodiments, the sensor could be a Hall-effect sensor.

The sensor member 50 is an electronic unit including the sensor 51 and a transponder 52 intended to communicate wirelessly with a detector 58 positioned in a suitable place inside or close to the machine or the vehicle to which the rolling-contact bearing is fitted. This position of the sensor 51 can be selected such that the connection of same to a control unit of the machine or of the vehicle is easy and carried out such that damage to a wire or to a cable bundle can be avoided. The reliability of the sensor system can therefore be enhanced.

As indicated above, the detector 58 is mounted on a bearing including the support member 18. The inventors have surprisingly found that reliability can be enhanced by replacing wired communication with wireless communication, even if the transponder 52 and the detector 58 designed to receive the signals of same are constrained to rotate with the same bearing.

Furthermore, the sensor member 50 includes independent energy-generation feature 56. The energy-generation feature 56 includes at least one coil interacting with an oscillating magnetic field created by the encoder washer 32. This coil is mounted on the same plate or the same PCB as the sensor 51.

The architecture of the sensor member 50 is based on an RFID label including the sensor 51, the signal processing component and the transponder 52, as well as a memory in a single unit. The sensor member 50 includes an antenna to receive the signals, exciting an electromagnetic resonant circuit and can therefore work either using the energy generated by the energy-generation feature using a relative rotation of the encoder washer 32, or using the energy supplied from outside in a passive operating mode.

The invention makes it possible to build a reliable sensor system with a long service life, even in environments in which the cables used to connect the sensor member 50 are liable to get damaged.

What is claimed is:

1. A rolling-contact bearing including:
   an inner ring;
   an outer ring with an outer surface in the form of a section of a sphere;
   rolling bodies between the inner ring and the outer ring;
   an encoder washer constrained to rotate with the inner ring;
   a sensor member designed to detect a rotation of the encoder washer; and
   a bearing including a support member, the support member having an inner surface in the form of a section of a sphere, the inner surface being designed to be in sliding contact with the outer surface of the outer ring, the support member being designed to hold the sensor member, in relation to the encoder washer, in a position in which the sensor member can detect a rotation of the encoder washer,
   wherein the sensor member includes a transponder adapted to communicate wirelessly with a detector,
   wherein the detector is constrained to rotate with the bearing including the support member.

2. The rolling-contact bearing as claimed in claim 1, the sensor member further comprising an independent energy-generation feature.

3. The rolling-contact bearing as claimed in claim 2, wherein the energy-generation feature includes at least one coil interacting with an oscillating magnetic field created by the encoder washer.

4. The rolling-contact bearing as claimed in claim 1, wherein the sensor member is a Radio Frequency Identification (RFID) label.

* * * * *